US012693228B2

(12) United States Patent (10) Patent No.: US 12,693,228 B2
Sen Gupta et al. (45) Date of Patent: Jul. 28, 2026

(54) ELECTROMAGNETIC INSPECTION SYSTEMS AND METHODS

(71) Applicant: General Electric Company, Schenectady, NY (US)

(72) Inventors: Esha Sen Gupta, Bengaluru (IN); Aditya Kulkarni, Bengaluru (IN); Mamatha Nagesh, Bengaluru (IN); Bernard P. Bewlay, Niskayuna, NY (US); Ambarish J. Kulkarni, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 133 days.

(21) Appl. No.: 18/602,826

(22) Filed: Mar. 12, 2024

(65) Prior Publication Data

US 2025/0290859 A1 Sep. 18, 2025

(51) Int. Cl.
*G01N 21/84* (2006.01)
*G01N 21/3581* (2014.01)

(52) U.S. Cl.
CPC ..... *G01N 21/8422* (2013.01); *G01N 21/3581* (2013.01); *G01N 2021/8427* (2013.01); *G01N 2201/127* (2013.01)

(58) Field of Classification Search
CPC .......... G01N 21/8422; G01N 21/3581; G01N 2021/8427; G01N 2201/127; G01N 21/94;

(Continued)

(56) References Cited

U.S. PATENT DOCUMENTS

| | | | | | |
|---|---|---|---|---|---|
| 3,994,586 | A | * | 11/1976 | Sharkins | G01B 11/065 |
| | | | | | 356/73 |
| 4,448,538 | A | * | 5/1984 | Mantel | F01N 1/22 |
| | | | | | 181/227 |

(Continued)

FOREIGN PATENT DOCUMENTS

| | | |
|---|---|---|
| CN | 108519059 | 9/2018 |
| CN | 208998745 | 6/2019 |

(Continued)

OTHER PUBLICATIONS

Whittle et al. "The structure and ordering of zirconium and hafnium containing garnets studied by electron channelling, neutron diffraction and Mössbauer spectroscopy", J. of Solid State Chemistry, 180 (2007) pp. 785-791.*

(Continued)

*Primary Examiner* — Mohamed K Amara

(74) *Attorney, Agent, or Firm* — Fitch, Even, Tabin & Flannery LLP

(57) ABSTRACT

In some embodiments, a system for evaluation a coating, such as a thermal barrier coating, includes an electromagnetic inspection device and a controller in operative communication with the electromagnetic inspection device. The electromagnetic inspection device includes an electromagnetic radiation source and a detector. The electromagnetic radiation source generates pulsed electromagnetic radiation that penetrates through a coating of a component of an engine. The detector receives reflected electromagnetic radiation that is reflected from the component. The controller is configured to receive electromagnetic radiation waveform that is representative of the reflected electromagnetic radiation. The controller is also configured to determine a property of the coating based on the electromagnetic radiation waveform and to determine a remaining life of the (Continued)

coating based on the property. The controller may also be configured to communicate a control command to the engine based on the remaining life.

20 Claims, 6 Drawing Sheets

(58) Field of Classification Search
 CPC ...... G01N 21/3563; G01N 21/55; F23R 3/06; F23R 3/346
 See application file for complete search history.

(56) References Cited

U.S. PATENT DOCUMENTS

| | | | |
|---|---|---|---|
| 7,095,221 B2 | 8/2006 | Bosselmann | |
| 7,373,823 B2 | 5/2008 | Bosselmann | |
| 7,396,759 B1 * | 7/2008 | van Schravendijk | ........................ H10W 20/037 257/E21.575 |
| 7,933,027 B1 * | 4/2011 | Roth | ................... G01N 21/3581 356/27 |
| 8,624,604 B2 | 1/2014 | Heyworth | |
| 8,692,887 B2 * | 4/2014 | Ringermacher | ... G01B 11/0658 348/86 |
| 9,000,777 B2 | 4/2015 | Holmquist | |
| 9,017,792 B2 | 4/2015 | Liu | |
| 9,157,730 B2 * | 10/2015 | Rajagopalan | ........... C23C 16/52 |
| 9,212,947 B2 * | 12/2015 | Feist | ......................... C23C 4/12 |
| 9,322,712 B2 | 4/2016 | Neshat | |
| 9,983,147 B2 * | 5/2018 | Ahmadian | ............. G01N 25/72 |
| 10,013,752 B2 | 7/2018 | Salm | |
| 10,254,219 B1 | 4/2019 | Adams | |
| 10,648,937 B2 | 5/2020 | Baucke | |
| 10,690,602 B2 * | 6/2020 | Sapiens | ............... G03F 7/70625 |
| 10,834,790 B2 | 11/2020 | Harris | |
| 11,099,002 B2 | 8/2021 | Sen Gupta | |
| 11,180,265 B2 * | 11/2021 | Bewlay | ..................... B64F 5/60 |
| 11,328,380 B2 * | 5/2022 | Pinter | ..................... G06T 7/586 |
| 11,504,813 B2 | 11/2022 | Whittle | |
| 2003/0016358 A1 | 1/2003 | Nagashima | |
| 2005/0247877 A1 * | 11/2005 | Mackin | ................. C23C 14/547 250/341.1 |
| 2012/0283963 A1 * | 11/2012 | Mitchell | ............... F01D 21/003 702/34 |
| 2014/0118751 A1 * | 5/2014 | Rajagopalan | ......... H01L 21/687 356/630 |
| 2014/0139838 A1 * | 5/2014 | Schauer | ................. G01N 21/55 356/445 |
| 2015/0160097 A1 * | 6/2015 | Haldeman | ............. F01D 21/003 374/4 |
| 2016/0069673 A1 | 3/2016 | Takayanagi | |
| 2018/0120246 A1 | 5/2018 | Baucke | |
| 2018/0238814 A1 * | 8/2018 | Sapiens | .............. G01B 11/0625 |
| 2018/0364037 A1 | 12/2018 | Singh | |
| 2019/0367190 A1 * | 12/2019 | Bewlay | ..................... B64F 5/60 |
| 2019/0375689 A1 | 12/2019 | Saha | |
| 2020/0182805 A1 | 6/2020 | Wang | |
| 2020/0240909 A1 | 7/2020 | Maas | |
| 2021/0172726 A1 * | 6/2021 | Sen Gupta | ......... G01N 21/3563 |
| 2024/0159681 A1 | 5/2024 | Kulkarni | |

FOREIGN PATENT DOCUMENTS

| | | |
|---|---|---|
| DE | 102011104708 | 12/2012 |
| EP | 2995904 | 3/2016 |
| EP | 3835760 | 6/2021 |
| JP | 2011064512 | 3/2011 |
| JP | 5493208 | 5/2014 |
| JP | 2015143666 | 8/2015 |
| JP | 6281941 | 2/2018 |
| WO | 2000065331 | 11/2000 |

OTHER PUBLICATIONS

Poursaeidi et al. "The effect of CMAS penetration on the microstructure and failure of the TBCs applied by APS/APS method", Surface and Coatings Tech, 451, (2022).*

Fukuchi, Tetsuo, et al. "Measurement of Refractive Index and Thickness of Topcoat of Thermal Barrier Coating by Reflection Measurement of Terahertz Waves." Electronics & Communications in Japan, vol. 96, No. 12, Dec. 2013, pp. 37-45. EBSCOhost, https://doi.org/10.1002/ecj.11551. (Year: 2013).*

Sun, F. et al., "Terahertz Based Thickness Measurement of Thermal Barrier Coatings Using Long Short-Term Memory Networks and Local Extrema", IEEE Transactions on Industrial Informatics, IEEE Service Center, New York, NY, US, vol. 18, No. 4, Jul. 26, 2021 (Jul. 26, 2021), pp. 2508-2517, 10 pp.

USPTO; U.S. Appl. No. 18/089,941; Non-Final Rejection mailed Dec. 3, 2024; (pp. 1-18).

USPTO; U.S. Appl. No. 18/089,941; Non-Final Rejection mailed Aug. 8, 2025; (pp. 1-18).

"Effective Optical Properties of Nanoporous Materials-Simulations", Optical Properties of Materials and Their Applications, 2nd Edition, Jai Singh (Editor), Peter Capper (Series Editor), Arthur Willoughby (Series Editor), Safa Kasap (Series Editor), ISBN: 978-1-119-50600-3, doi:10.1016/j.tsf.2005.08.173; https://www.seas.ucla.edu/~pilon/OpticsNanoporous.html; (5 pgs.).

Fukuchi et al., "Measurement of Topcoat Thickness of Thermal Barrier Coating for Gas Turbines Using Terahertz Waves", Electrical Engineering in Japan, vol. 183, No. 4, 2013, (Translated from Denki Gakkai Ronbunshi, vol. 132-A, No. 2, Feb. 2012, pp. 166-172).

Fukuchi, et al., "Measurement of Refractive Index and Thickness of Topcoat of Thermal Barrier Coating by Reflection Measurement of Terahertz Waves", Nov. 11, 2013, vol. 96, Issue 12, pp. 37-45; https://onlinelibrary.wiley.com/doi/10.1002/ecj.11551.

Matthew M. Braun, et al., "Effective optical properties of non-absorbing nanoporous thin films", Thin Solid Films 496 (2006) pp. 505-514, Available online Sep. 15, 2005.

Min Zhai et al., "Diagnosis of injection-molded weld lines in ABS thermoplastic by polarized terahertz reflective imaging", Elsevier, NDT and E International 122 (2021), 7 pgs.

Niklasson, G.A., et al., "Effective medium models for the optical properties of inhomogeneous materials", Applied Optics, vol. 20, No. 1, Jan. 1, 1981, pp. 26-30; https://www.researchgate.net/publication/42390036.

Roth et al., "Absolute Thickness Measurements on Coatings Without Prior Knowledge of Material Properties Using Terahertz Energy", NASA/TM—2013-216603. Dec. 2013, pp. 1-28.

USPTO; U.S. Appl. No. 18/089,941; Application filed Dec. 28, 2022, entitled "Inspection System and Method for Determining the Microstructure for a Coating".

USPTO; U.S. Appl. No. 18/089,941; Final Rejection mailed Apr. 18, 2025; (pp. 1-18).

USPTO; U.S. Appl. No. 18/089,941; Notice of Allowance and Fees Due (PTOL-85) mailed Jan. 8, 2026; (pp. 1-9).

* cited by examiner

ELECTROMAGNETIC INSPECTION SYSTEMS AND METHODS

TECHNICAL FIELD

These teachings relate generally to inspection of a component and more particularly to inspection of a coating thereof.

BACKGROUND

Various protective coatings may be used to protect components. Protective coatings may include thermal barrier coatings that help to protect parts operating at elevated temperatures, such as internal parts of an aircraft turbine engine. Protective coatings, however, may be subject to infiltration by foreign materials such as calcium magnesium aluminosilicate (CMAS). CMAS may originate as siliceous debris such as sand or volcanic ash, which may be ingested into an aircraft turbine engine. At elevated temperatures, CMAS may melt and infiltrate a protective coating on a component of the aircraft turbine engine. CMAS infiltration may degrade protective coatings on components and, as a result, compromise the underlying component.

BRIEF DESCRIPTION OF DRAWINGS

Various needs are at least partially met through provision of the electromagnetic inspection systems and methods described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
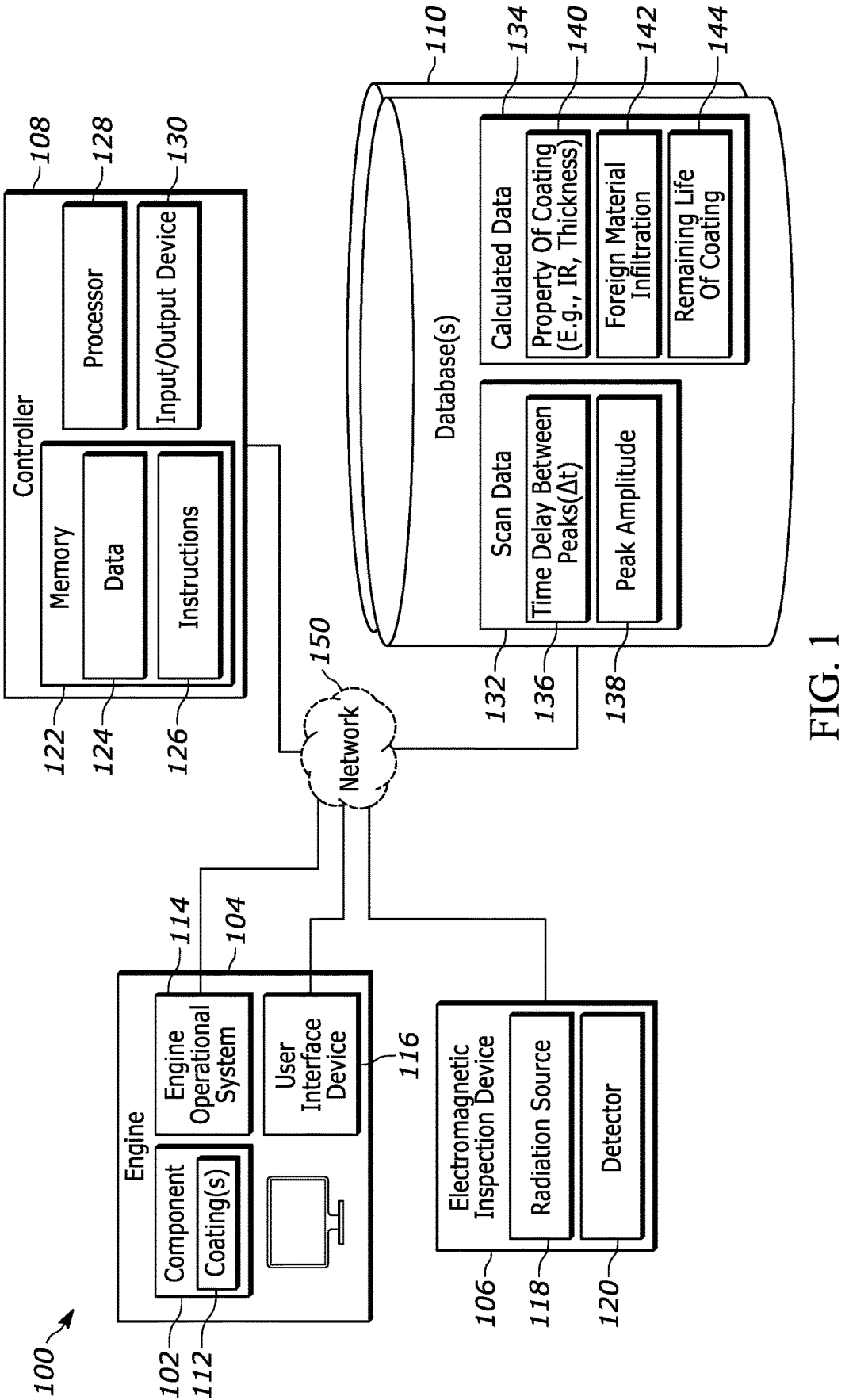
FIG. 1 is a block diagram of an electromagnetic inspection system for detecting at least one of a condition or remaining life of a coating, in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The approaches provided herein use electromagnetic radiation, for example in the terahertz range, to probe a part coated with a coating to determine the remaining life of the coating and/or a level of foreign material (e.g., CMAS) infiltration. The coating is probed with pulsed electromagnetic radiation that is reflected from the coating. The reflected electromagnetic radiation can then be assessed, for example, to determine changes in the waveform of the electromagnetic radiation. For example, peaks of the reflected electromagnetic radiation waveform may be different between an infiltrated and a non-infiltrated coating. Accordingly, the systems and methods described herein use reflected electromagnetic radiation waveforms to assess a coating and, in particular, to determine a remaining life of the coating. The systems and methods described herein may also use the reflected electromagnetic radiation waveforms to determine a condition of the coating, such as a level of foreign material infiltration, coating thickness, and/or whether foreign material is infiltrated and/or deposited on the coating.

Traditional approaches for determining the remaining life for a coating or determining the level of foreign material (e.g., CMAS) infiltration into the coating may involve destructive testing. For example, a part may be cut up to examine the coating integrity and how much coating remains on the part. In such an approach, the part might not be returned to service and, instead, might be scrapped and replaced, which is expensive and time-consuming. Generally speaking, the systems and methods described herein provide non-destructive approaches for evaluating a coating on a part. The approaches described herein may be used to evaluate a coating without contacting, destroying, or preparing the part. Since the part is not destroyed using the approaches describing herein, the part can be returned to service for continued use. As such, the approaches described herein can reduce the cost and time, as compared with traditional destructive approaches.

In some embodiments, the systems and methods provided herein can be used to assess thermal barrier coatings. It is contemplated, however, that the systems and methods may be applied to any protective coating. In some embodiments, the systems and methods may be used to assess a dielectric coating. As used herein, a refractive index may refer to a coating having a refractive index (RI) within the range of about 3.0 and about 5.2.

In some aspects, an inspection system comprises an electromagnetic inspection device and a controller. The electromagnetic inspection device includes an electromagnetic radiation source for generating pulsed electromagnetic radiation that penetrates through a coating of a component, such as a component of an engine. In some approaches, the electromagnetic radiation source generates pulsed electromagnetic radiation in a terahertz frequency range. The electromagnetic inspection device also includes a detector for receiving reflected electromagnetic radiation that is reflected from the component. The controller is in operative communication with the electromagnetic inspection device. The controller is configured to receive an electromagnetic radiation waveform that is representative of the reflected electromagnetic radiation. The controller is also configured to determine a property of the coating based on the electromagnetic radiation waveform. In some approaches, the property of the coating is a dielectric property of the coating or a loss of material from the coating. The controller is further configured to determine a remaining life of the coating based on the property and update a model of the engine based on the remaining life of the coating. In some approaches, the controller may be further configured to determine a condition, such as a level of foreign material infiltration, of the coating based on the property of the coating. In such an approach, the controller may determine the remaining life based on the condition of the coating.

In some aspects, a method includes at an electromagnetic radiation source, directing pulsed electromagnetic radiation through a coating of a component, such as a component of an engine. The method also includes, at a detector, receiving reflected electromagnetic radiation that is reflected from at least one of the coating or the component. The method also includes determining a property of the coating based on the reflected electromagnetic radiation. The method further includes determining a remaining life of the coating based on the property and adjusting operation or maintenance of the engine based on the remaining life.

Referring now to the drawings, and in particular to FIG. 1, a system 100 that is compatible with many of these teachings is presented. The system 100 is an electromagnetic inspection system that can be used to inspect or monitor a component 102. The component 102 may be a component of an engine 104, for example, a gas turbine engine used in an aircraft. For example, the component 102 may be a turbine blade or a turbine nozzle of the engine 104. The component 102 has one or more coatings 112. In some examples, one or more of the coating(s) 112 is/are a thermal barrier coating, such as a yttria-stabilized zirconia.

The system 100 includes an electromagnetic inspection device 106 and a controller 108 that are in communication over a network 150. The system 100 may also include one or more databases 110 in communication with one or more of the electromagnetic inspection device 106 and the controller 108.

Figure 2:
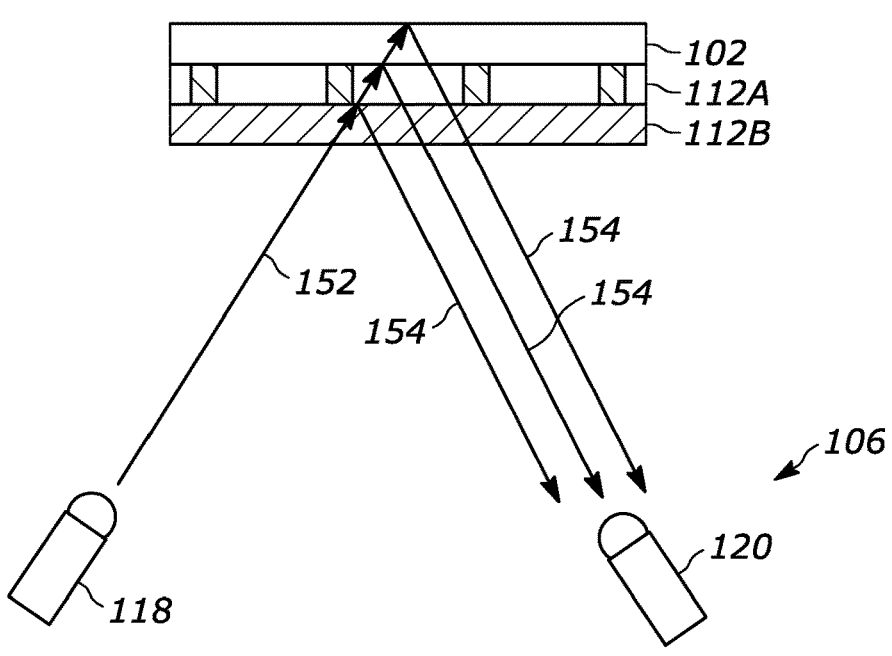
FIG. 2 is a schematic diagram of an exemplary component and electromagnetic inspection device, in accordance with various embodiments of these teachings.

The electromagnetic inspection device 106 includes a radiation source 118 and a detector 120. A schematic diagram of the electromagnetic inspection device 106, in accordance with some embodiments, is shown in FIG. 2. It is contemplated, however, that the radiation source 118 and the detector 120 of the electromagnetic inspection device 106 may have any suitable configuration that directs electromagnetic radiation towards the component 102 and detects electromagnetic radiation reflected from the component 102.

The radiation source 118 emits, transmits, or generates pulsed electromagnetic radiation that penetrates through the coating 112 of the component 102. The radiation source 118 may generate pulsed electromagnetic radiation at any suitable frequency range and, in some aspects, generates pulsed electromagnetic radiation in the terahertz frequency range. Pulsed electromagnetic radiation can penetrate through the coating 112 with minimal scatter. As used herein, the terahertz frequency range refers to frequencies between about 0.1 terahertz (THz) and about 10 THz. In some aspects, coating thickness may be determined from the pulsed data. The radiation source 118 may be any suitable radiation source or excitation source that generates or emits electromagnetic radiation. Suitable radiation sources include, for example, lasers or molecular lasers. In some examples, the radiation source 118 includes a plurality of radiation sources. In some examples, the component 102 is metal, which serves a substrate for the coating 112. Metal is opaque to the Terahertz frequency range and accordingly reflects Terahertz radiation, making it easier to measure reflection of the electromagnetic radiation.

The detector 120 detects or receives electromagnetic waves that are emitted from the radiation source 118. In some aspects, the detector 120 detects electromagnetic waves that are emitted from the radiation source and reflected from a specimen such as the component 102 or a portion thereof such as the coating(s) 112. The detector 120 may be any suitable device capable of receiving, measuring, quantifying, or otherwise detecting electromagnetic waves or electromagnetic radiation generated from, for example, photoconductive antennas, nonlinear crystal materials, etc. The detector 120 may convert incoming electromagnetic waves or radiation into electrical measuring signals that are indicative of the incoming reflected electromagnetic radiation. In some examples, the detector 120 may include a plurality of detectors.

The controller 108 receives data from the electromagnetic inspection device 106. For example, the controller 108 may receive electromagnetic radiation data in the form of electrical measuring signals from the electromagnetic inspection device 106 and, in particular, from the detector 120. The electromagnetic radiation data may include any data that relates to a waveform of an electromagnetic wave reflected from a specimen, such as the component 102 or the coating(s) 112. In some examples, the electromagnetic radiation data is an electromagnetic radiation waveform. It is contemplated that the controller 108 may be configured to perform one of more of the methods described herein or portions thereof.

The controller 108 may function as a computing device to perform the functions and methods described herein. The controller 108 may include one or more processors 128, input/output (I/O) devices 130, and memory devices 122. The processors 128 may include any suitable processing device such as a microprocessor, microcontroller, integrated circuit, logic device, or other suitable processing device. The processors 128 may be used to execute or assist in executing the steps of the processes, methods, functionality and techniques described herein, and to control various communications, decisions, programs, content, listings, services, interfaces, logging, reporting, etc. Further, the one or more processors 128 may access the memory devices 122, which may store instructions 126, code and the like that are implemented by the processors 128 to implement intended functionality.

The memory devices 122 typically include one or more processor-readable and/or computer-readable media accessed by at least the processors 128 and may include volatile and/or nonvolatile media, such as RAM, ROM, EEPROM, flash memory and/or other memory technology. Further, the memory devices 122 are shown as internal to the controller 108; however, the memory devices 122 may be internal, external or a combination of internal and external memory. Similarly, some or all of the memory devices 122 can be internal, external or a combination of internal and external memory of the processors 128. The memory devices 122 may be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network. The memory devices 122 may store data 124 such as code, software, executables, scripts, data, content, lists, programming, programs, log or history data, engine information, component information, and the like. While FIG. 1 illustrates the various components being coupled together via a bus, it is understood that the various components may actually be coupled to the controller 108 and/or one or more other components directly.

The I/O devices 130 may be any relevant port or combinations of ports, such as but not limited to USB, Ethernet, or other such ports. The I/O devices 130 may be configured to allow wired and/or wireless communication coupling to external components. For example, the I/O devices 130 may provide wired communication and/or wireless communication (e.g., Wi-Fi, Bluetooth, cellular, RF, and/or other such wireless communication), and in some instances may include any suitable wired and/or wireless interfacing device, circuit and/or connecting device, such as but not limited to one or more transmitters, receivers, transceivers, or combination of two or more of such devices.

In some approaches, the controller 108 may be configured to determine a property of the coating(s) 112 and/or the component 102 based on electromagnetic radiation data, for example, based on characteristics of a reflected electromagnetic radiation waveform. The property of the coating(s) 112 may be a dielectric property of the coating. The dielectric properties of the coating(s) 112 may impact the manner in which electromagnetic radiation travels through the coating(s) 112. For example, the refractive index of the coating(s) 112 may vary as a function of a coating condition such as a level of foreign material infiltration. As such, the property of the coating(s) 112 may correlate with the coating condition, which may then be used to determine a remaining life of the coating. In some approaches, the controller 108 compares the property or the condition of the coating(s) 112 to a threshold value to determine a remaining life of the coating(s) 112 and whether the coating(s) 112 are fit for continued service.

The controller 108 may be configured to determine a remaining life for one or more of the coating(s) 112 and/or the component 102 based on the property of the coating(s) 112. In some embodiments, the controller 108 is configured to determine the remaining life of the coating(s) 112 based on calibration data. The calibration data may include a relationship between the property of the coating(s) 112 and the remaining life of the coating(s) 112.

In some embodiments, the controller 108 is further configured to determine or assess a condition of the coating(s) 112 based on the property of the coating(s) 112. In one example, the condition of the coating(s) 112 is a level of foreign material infiltration of the coating(s) 112. The remaining life of the coating(s) 112 may then be based on the condition of the coating(s) 112. For example, the controller 108 may be configured to determine the remaining life based on calibration data that includes a relationship between the condition of the coating(s) 112 and the remaining life of the coating(s) 112.

In some embodiments, the controller 108 is also configured to compare the electromagnetic radiation data (e.g., an electromagnetic radiation waveform) to baseline data. For example, the controller 108 compares the electromagnetic radiation data to baseline data by determining a ratio of the electromagnetic radiation data to the baseline data. The baseline data may be indicative of electromagnetic radiation that is reflected from the component in a prior state. Thus, the controller 108 may determine a change in electromagnetic radiation data, for example, a change in the electromagnetic radiation waveform. The controller 108 may then determine the remaining life of the coating based on the comparison of the electromagnetic radiation data to the baseline data. In some examples, the baseline data is stored in the memory devices 122 and/or the databases 110.

In some approaches, the controller 108 is configured to compare the remaining life of the coating to a threshold value. The controller 108 may then determine the action for the engine 104 upon determining that the remaining life of the coating falls below the threshold value. In some examples, the threshold value is stored in the memory devices 122 and/or the databases 110.

The controller 108 may also be configured to update a model of the engine 104 based on the remaining life of the coating(s) 112. An engine or fleet of engines may have one or more associated models, for example, that model wear or deterioration, operational characteristics, etc. of the engine or components thereof. In one example, the controller 108 may update such a model of the engine to correspond more closely with real world observations from inspections. In one example, if based on an inspection via the systems and methods described herein, the controller 108 determines that the remaining life reflects more rapid deterioration of the coating(s) 112 than what is modeled by a model, the controller 108 may adjust the model to align with the remaining life as determined by the controller 108. In this manner, the engine model may be customized to real-world performance, as determined by the inspection systems and methods described herein. In some examples, the model of the engine 104 may be stored in the memory device 122. In other examples, the model may be stored in a memory or other external data system that is in communication with the controller 108.

Additionally, the controller 108 may be configured to determine an action for the engine 104 based on the remaining life. In some approaches, the controller 108 is configured to compare the remaining life of the coating to a threshold value. The controller may determine the action for the engine 104 upon determining that the remaining life of the coating(s) 112 falls below the threshold value. Actions may include, for example, de-rating the engine 104, repairing the component 102, replacing the component 102 or the coating(s) 112, cleaning the component 102, adjusting a route for the aircraft powered by the engine, or changing a payload for the engine 104. The actions may adjust operation of the engine in a manner that is more suitable for the component as indicated by the remaining life. For example, when the remaining life is short, the action may be to redeploy the engine to a less harsh operating environment. In some implementations, the controller 108 may communicate a control command to the engine 104 to implement or carry out the action for the engine 104. The controller 108 may also communicate the action to a user of the engine 104, for example, via a user interface.

In one example, the controller 108 is in communication with an engine operational system 114. In this manner, the controller 108 may communicate an action to the engine operational system 114 to adjust operation of the engine 104. For example, the control command may adjust operation of the engine 104 by de-rating the engine 104, adjusting a route for the aircraft powered by the engine 104, or changing a payload for the engine 104.

In another example, the controller 108 is in communication with a user interface device 116 associated with the engine 104. In this manner, the controller 108 may communicate or transmit an alert or electronic message to the user interface device 116 for a user such as an operator, a technician, a manager, or an owner of the engine 104. The controller 108 may transmit an alert or message to the user interface device 116 regarding a maintenance, repair, cleaning, or treatment action or schedule. For example, the alert or message may relate to repairing, cleaning, decommissioning, or adding a new coating to the component 102 of the engine 104.

The one or more databases 110 may be in communication with one or more of the electromagnetic inspection device 106 and the controller 108 over the network 150. The network 150 may communicate information to or from one of the database(s) 110.

The database(s) 110 may store data acquired by the electromagnetic inspection device 106. The database(s) 110 may store scan data 132. The scan data 132 may include any data acquired by the electromagnetic inspection device 106 and any data related to the parameters or settings of the electromagnetic inspection device 106, for example, during a scan or inspection of the component 102 or a portion thereof. The scan data 132 may include electromagnetic radiation data. The electromagnetic radiation data may be data on an electromagnetic radiation waveform or any other data that relates to electromagnetic radiation that is reflected from the coating(s) 112 or the component 102. In some examples, the electromagnetic radiation data may include one or more of a transit time or time delay between peaks 136 and a peak amplitude 138 (e.g., when data is in the frequency domain) or a peak electric field (e.g., $E_{max}$, $E_{min}$) (e.g., when data is in the time domain) of the waveform of the electromagnetic radiation that is reflected from the coatings(s) 112 or the component 102.

The database(s) 110 may also store any data received, determined, or useful to operations performed by the controller 108. For example, the database(s) 110 may also store calculated data 134 that is calculated or determined by the controller 108. The calculated data 134 may include data on one or more of a property of the coating(s) 140, a measure of foreign material infiltration 142, and a remaining life of the coating(s) 144.

In some embodiments, the system 100 is in communication with the engine 104 or a component or system thereof. The system 100 may communicate one or more control commands to the engine 104 (or a component or system thereof) in response to determinations made by the controller 108.

One or more components of the system 100 including the electromagnetic inspection device 106, the controller 108, the database(s) 110, the engine operational system 114, and the user interface device 116 may communicate information to or from one another over the network 150. The network 150 may be any suitable communication network such as, for example, LAN, WAN, Internet, cellular, Wi-Fi, and other such communication networks or combinations of two or more of such networks.

FIG. 2 is a schematic diagram of the electromagnetic inspection device 106 and the component 102, in accordance with some embodiments. In the illustrative example of FIG. 2, the component 102 includes a first coating 112A and a second coating 112B. The first coating 112A may be, for example, a pristine thermal barrier coating or a thermal barrier coating infiltrated with CMAS. In some examples, the first coating 112A may include multiple types of thermal barrier coatings (TBCs). The second coating 112B may be a layer of CMAS buildup on top of the thermal barrier coating, for example, after the thermal barrier coating has been completely infiltrated with CMAS.

The radiation source 118 emits electromagnetic waves 152 towards the component 102 to irradiate the component 102. The electromagnetic waves 152 are reflected from the second coating 112B to generate reflected electromagnetic waves 154.

The detector 120 detects or receives the reflected electromagnetic waves 154. The reflected electromagnetic waves 154 may include a first peak that is indicative of an interface between air and the second coating 112B (e.g., an air-CMAS interface). The reflected electromagnetic waves 154 may also include a second peak that is indicative of an interface between the second coating 112B and the first coating 112A (e.g., a CMAS-thermal barrier coating interface). The reflected electromagnetic waves 154 may also include a third peak that is indicative of an interface between the first coating 112A and the component 102 (e.g., a thermal barrier coating-component interface). FIG. 4C shows an exemplary waveform for the reflected electromagnetic waves 154 for the component 102 as configured in FIG. 2 with the first coating 112A (e.g., a thermal barrier coating) and the second coating 112B (e.g., CMAS buildup).

From the analysis of the waveform of the reflected electromagnetic waves 154, the system 100 can determine one or more properties of the first coating 112A and one or more properties of the second coating 112B. For example, the waveform of the reflected electromagnetic waves correlate with one or more of a condition of the coating, a thickness of the coating, or infiltration of a foreign material such as CMAS into the coating.

Figure 3:
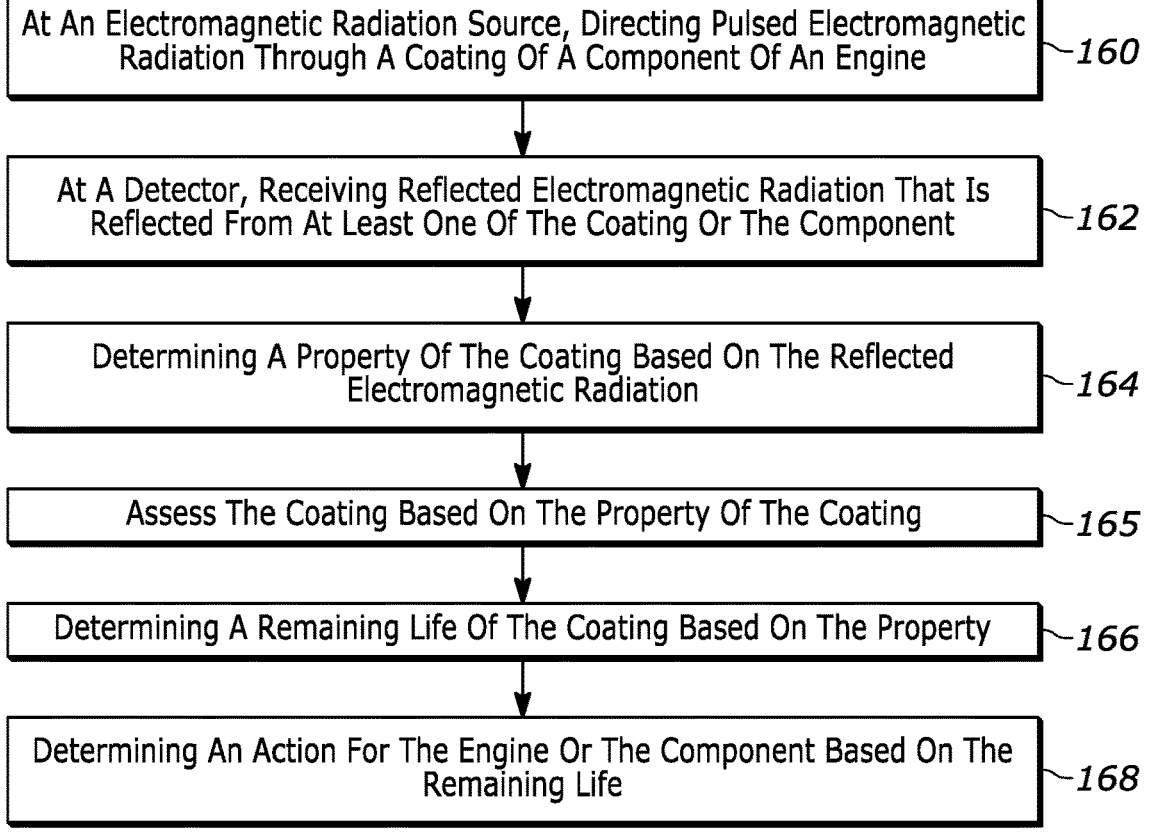
FIG. 3 is a flow diagram of an exemplary inspection method, in accordance with various embodiments of these teachings.

Turning now to FIG. 3, a method of inspecting a component is illustrated. One or more steps of the method may be performed by the system 100 of FIG. 1.

At block 160, an electromagnetic inspection device directs pulsed electromagnetic radiation through a coating of a component of an engine. In some examples, the coating is a thermal barrier coating. The electromagnetic inspection device may direct pulsed electromagnetic radiation through the coating at an electromagnetic radiation source of the electromagnetic inspection device. In some approaches, the radiation source 118 of the electromagnetic inspection device 106 in the system 100 directs electromagnetic radiation through the coating(s) 112 of the component 102. In some examples, the radiation source 118 is activated and/or otherwise controlled by the controller 108.

At block 162, the electromagnetic inspection device receives electromagnetic radiation that is reflected from at least one of the coating or the component. The electromagnetic inspection device may receive the reflected electromagnetic radiation at a detector of the electromagnetic inspection device. In some approaches, the detector 120 of the electromagnetic inspection device 106 in the system 100 receives the reflected electromagnetic radiation. The detector 120 may generate and/or communicate an electrical signal that is indicative or representative of a waveform of the reflected electromagnetic radiation.

At block 164, a controller determines a property of the coating based on the reflected electromagnetic radiation waveform. In some embodiments, the property of the coating is a dielectric property of the coating or a loss of material from the coating. Examples of dielectric properties of the coating include refractive index (RI) or attenuation. A dielectric property can refer to a combination of the refractive index for a real part and an imaginary part that reflects attenuation. The property of the coating relates, at least in part, to a loss of energy in the coating which can relate to a dielectric property of the coating and scattering. The loss of energy that is measured is due, for example, to the absorption and/or scatter of the electromagnetic radiation. Loss of energy can be determined based on an extinction coefficient or a scattering coefficient. The property of the coating can also be a physical property such as coating thickness or coating density. In some approaches, the controller 108 in the system 100 determines the property of the coating(s) based on the reflected electromagnetic radiation.

The controller may determine the property of the coating based on the reflected electromagnetic radiation waveform. The controller may perform a fast Fourier transform to construct a time domain representation of a signal indicative of or representing the reflected electromagnetic radiation waveform to a frequency domain representation. The controller may determine the property of the coating based on one or more of a time shift between peaks in the waveform (e.g., a shift between a peak in a first electromagnetic radiation waveform and a peak in a second electromagnetic radiation waveform), a change in the amplitude or electric field (e.g., $E_{max}$, $E_{min}$) of one or more peaks in the waveform, the presence of additional peaks in the waveform, or a transit time between peaks in the waveforms. Amplitude may be assessed or determined via the frequency domain representation of the waveform while electric field (e.g., $E_{max}$, $E_{min}$) may be assessed or determined via the time domain representation of the waveform.

In one example, the controller is configured to receive an electromagnetic radiation waveform. The electromagnetic radiation waveform may include a first electromagnetic radiation waveform and a second electromagnetic radiation waveform. The controller may then be further configured to compare the first electromagnetic radiation waveform to the second electromagnetic radiation waveform. In some examples, the first electromagnetic radiation waveform is from a first scan of the component at a first time and the second electromagnetic radiation waveform is from a second scan of the component at a second time. Determining the property of the coating may be based on at least one of a time shift between a first peak of the first waveform and a first peak of the second waveform; a change in amplitude or electric field between the first peak of the first waveform and the first peak of the second waveform; an additional peak present in the second waveform; or a transit time between the first peak of the first waveform and a second peak of the first waveform.

The time shift between peaks in the reflected electromagnetic radiation waveform indicates a level of foreign material infiltration into the coating 112. As discussed above and illustrated further in FIG. 4B, the time shift between peaks may refer to a time difference between the time at which a peak is observed in a first electromagnetic radiation waveform (e.g., a waveform from a first scan) and the time at which a peak is observed in a second electromagnetic radiation waveform (e.g., a waveform from a second scan). The first electromagnetic radiation waveform may represent the coating 112 at a first point in time, for example, when the component 102 or coating 112 is new. The second electromagnetic radiation waveform may represent the coating 112 at a second point in time, for example, after the coating 112 has been applied or the component 102 installed in the engine 104. As such, the second electromagnetic radiation waveform may represent a coating that has been exposed to foreign materials during engine operation.

It is contemplated that the refractive index of the coating may increase as foreign material infiltration into the coating increases. The increase in the refractive index of the coating results in an increase in time of travel of electromagnetic radiation through the coating. That is, it takes longer for a pulse of electromagnetic radiation to travel through the coating. The increase in the time of travel shifts the time at which one or more peaks in the waveform appear in the time domain representation of the waveform. Advantageously, the reflected electromagnetic radiation waveform can be analyzed to determine a change in the reflective index of the coating, which is then used to infer or determine a level of foreign material infiltration. In contrast, traditional approaches for determining foreign material infiltration typically involve cutting up a sample to determine refractive index or the level of foreign material infiltration.

In another example, a change in amplitude or electric field (e.g., $E_{max}$, $E_{min}$) between peaks in the reflected electromagnetic radiation waveform indicates foreign material infiltration into the coating 112. A loss of energy in the electromagnetic radiation at the coating interface is observed as a decrease in the amplitude or electric field (e.g., $E_{max}$, $E_{min}$) in a peak in the waveform when comparing, for example, a first peak in a first electromagnetic radiation waveform (e.g., a waveform from a first scan) and a first peak in a second electromagnetic radiation waveform (e.g., a waveform from a second scan). The decrease in amplitude results, at least in part, from the increase in density and/or an increase in the refractive index of the coating, which occurs due to foreign material infiltration. Such a decrease in electric field is illustrated, for example, in FIG. 4B.

A loss of energy of the electromagnetic radiation in the coating may be observed as a decrease in the peak amplitude or electric field when comparing, for example, a second peak in a first electromagnetic radiation waveform and a second peak in the second electromagnetic radiation waveform. The decrease in amplitude or electric field may result from attenuation and scattering of electromagnetic radiation due to foreign material infiltration. Such a decrease in electric field is illustrated, for example, in FIG. 4B. As such, a ratio of the first peak to the second peak also indicates foreign material infiltration.

In another example, the appearance of an additional peak in the reflected electromagnetic waveform when comparing a first electromagnetic radiation waveform (e.g., a waveform from a first scan) to the second electromagnetic radiation waveform (e.g., a waveform from a second scan). An additional peak present in the reflected electromagnetic waveform indicates or represents an additional material interface on the component 102 which results from the accumulation or build-up of a foreign material on the coating 112. For example, when a coating is fully infiltrated, the foreign material can begin to accumulate on a surface of the coating 112, forming an additional layer of material that appears as an additional peak present in the reflected electromagnetic radiation waveform. The appearance of an additional peak due to foreign material build up is illustrated, for example, in FIG. 4C.

In yet another example, the transit time between peaks, for example, the transit time between a first peak and a second peak, in the waveform reflects the coating thickness. For example, in a first electromagnetic radiation waveform (e.g., a waveform from a first scan), the time between the first peak and the second peak in the time domain representation of the waveform indicates that the coating 112 has a first thickness. In a second electromagnetic radiation waveform (e.g., a waveform from a second scan), the time between the first peak and the second peak in the time domain representation of the waveform indicates that the coating 112 has a second thickness. In this manner, the waveform also reflects or indicates a loss of coating 112 on the component 102, for example, due to wear.

At block 165, the controller may optionally determine or assess a condition of the coating based on the property of the coating. In some examples, the remaining life of the coating is based on the condition of the coating. In some approaches, the controller 108 in the system 100 assesses a condition of the coating(s) 112 based on the property of the coating(s) 112. The condition of the coating may be, for example, a level of foreign material infiltration into the coating and/or whether or not foreign material is fused or built up onto the coating(s) 112. For example, the controller may determine a level of foreign material infiltration into the coating based on the property of the coating, for example, based on the refractive index of the coating.

In some approaches, assessing the condition of the coating includes comparing the property of the coating to data on the remaining life of the coating. Calibration data establishes or determines a level of foreign material infiltration based on the property (e.g., refractive index) for a particular coating. In one example, the calibration data includes a relationship between the condition of the coating 112 (e.g., level of foreign material infiltration) and the property of the coating 112 (e.g., refractive index). In this manner, the controller may use the calibration data to assess the condition of the coating based on the property of the coating. In some non-limiting examples, the condition of the coating is a level of foreign material infiltration. The level of foreign material infiltration may be a qualitative measure, for example, a percentage of the of the coating infiltrated (e.g., by volume or weight), a weight of foreign material infiltrated into a given area of the coating, and/or a depth of infiltration into the coating. In other examples, the level of foreign material infiltration may be a qualitative measure of infiltration such as high/medium/low, severe/moderate/none, or similar.

At block 166, the controller determines a remaining life of the coating based on the property. In some approaches, the controller 108 in the system 100 determines the remaining life of the coating(s) 112 based on the property of the coating(s) 112. Calibration data may be used to establish or determine a remaining life for the coating(s) 112 based on the condition of the coating, such as the level of foreign material infiltration or coating thickness. Calibration data may also be used to establish or determine a remaining life for the coating(s) 112 based on the property of the coating, such as the refractive index or energy loss in the coating. In one example, the calibration data includes a relationship between the condition of the coating 112 (e.g., level of foreign material infiltration) or the property of the coating 112 (e.g., refractive index) and the remaining life of the coating 112. The controller may use such calibration data to establish or determine a remaining life for the coating(s) 112 based on the condition of the coating(s) 112 and/or the property of the coating(s) 112.

As discussed above, properties of the coating, such as dielectric properties, reflect or correlate with a condition of the coating such as a level foreign material infiltration. The condition of the coating reflects or correlates with a remaining life of the coating. For example, a coating may have a certain remaining life based on the level of foreign material infiltration and may be determined to have no remining life after exceeding a threshold level of foreign material infiltration. As such, the controller can use properties of the coating determine a remaining life of the coating.

At block 168, the controller may determine an action for the engine or the component based on the remaining life of the coating. The controller 108 may determine an action for the engine or the component based on the remaining life of the coating. The controller 108 may also adjust operation or maintenance of the engine based on the determined action. In some examples, the controller 108 in the system 100 communicates a command to the engine 104 based on the action. The action may be any action that maximizes or otherwise improves a remaining service life of the engine

104 and/or the component 102. In some examples, the action includes de-rating the engine 104, repairing the component 102, replacing the component 102 or the coating(s) 112, cleaning the component 102, adjusting a route for the aircraft powered by the engine, changing a payload for the engine 104, redeploying the engine 104 or the component 102 (e.g., to a less severe cycle for a degraded coating). The controller 108 may also communicate a command to an engine operational system 114. For example, the controller communicates a command to the engine in response to determining that the remaining life falls below a threshold value.

In some approaches, the controller adjusts operation or maintenance of the engine based on the remaining life of the coating. For example, the controller adjusts operation or maintenance of the engine. The controller may adjust operation or maintenance of the engine to implement the action determined at block 168.

In some approaches, the controller also updates a model of the engine based on the remaining life of the coating. The controller 108 may update a model of the engine based on the remaining life of the coating. In one example, when the controller 108 determines that the remaining life reflects more rapid (or slow) deterioration of the coating(s) 112 that modeled by an engine model, the controller 108 adjusts the model to more closely align with the remaining life determined at block 166. In some examples, the model of the engine 104 is stored in the memory devices 122. In other examples, the model is stored in a memory or other external data system that is in communication with the controller 108.

In some approaches, the controller causes a message or alarm to be displayed via a user interface device associated with the engine. In some examples, the controller 108 causes a message or alarm to be displayed via the user interface device 116 associated with the engine 104. The user interface device 116 may be an audio, visual, virtual, augmented, or mixed reality device that includes one or more displays. In some examples, the message or alarm alerts a user of the engine 104 whether the engine 104 or component 102 is suitable for continued service or operation. In some examples, the message or alarm indicates that the engine 104 or the component 102 should be redeployed, repaired, or refurbished. In one example, the message or alarm alerts a user who is working on the engine, for example at an overhaul or repair shop, to a specific work scope in which the user is to go to a specific section of the engine and perform a task for the component 102.

In some approaches, the action determined at block 168 is to change or replace the coating. For example, the coating(s) 112 can be customized based on the remaining life. In one example, the controller 108 is in communication with a coating or repair device that adjust a coating for the component 102 based on the remaining life. In this manner, the system 100 can customize a coating for the component 102 based on the specific needs of the component 102 as determined via an inspection.

Figure 4A:
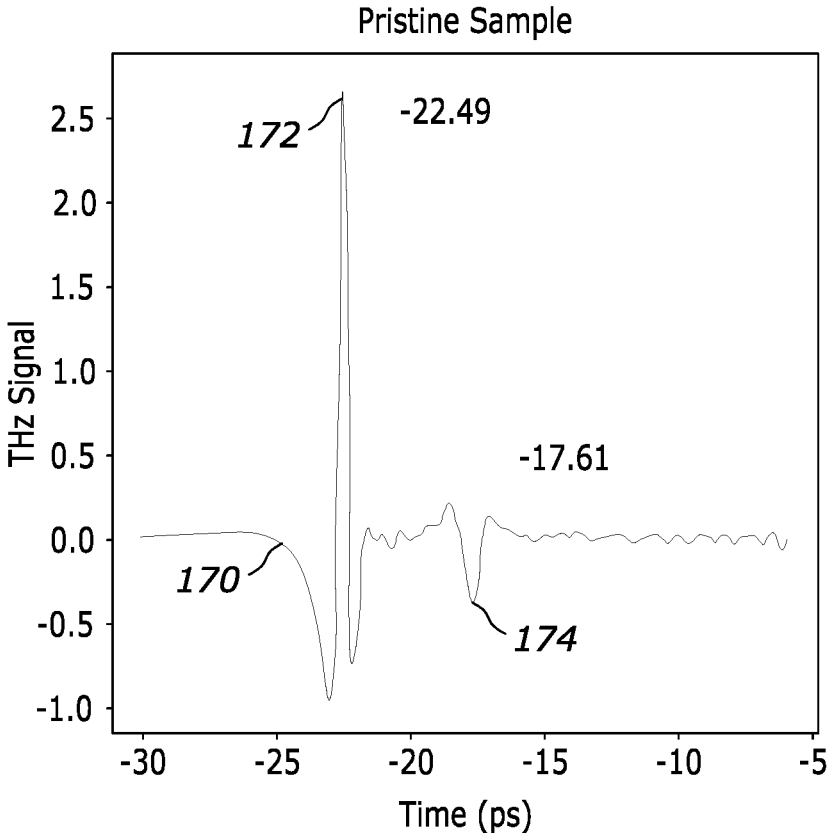
FIGS. 4A, 4B, and 4C show exemplary data obtained via the electromagnetic inspection system of FIG. 1, in accordance with various embodiments of these teachings.
Figure 4B:
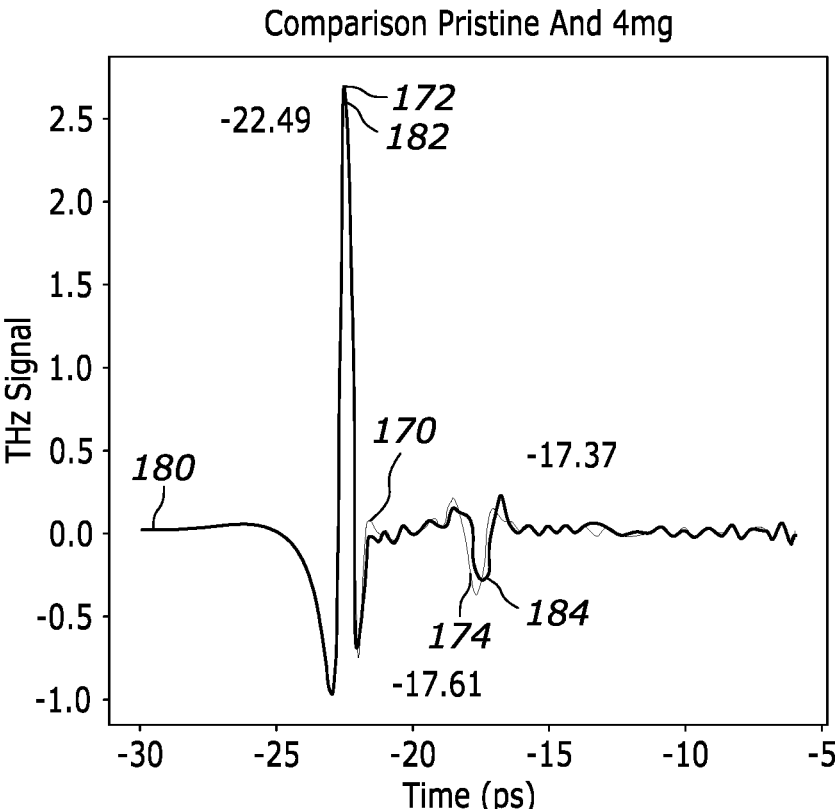
Figure 4C:
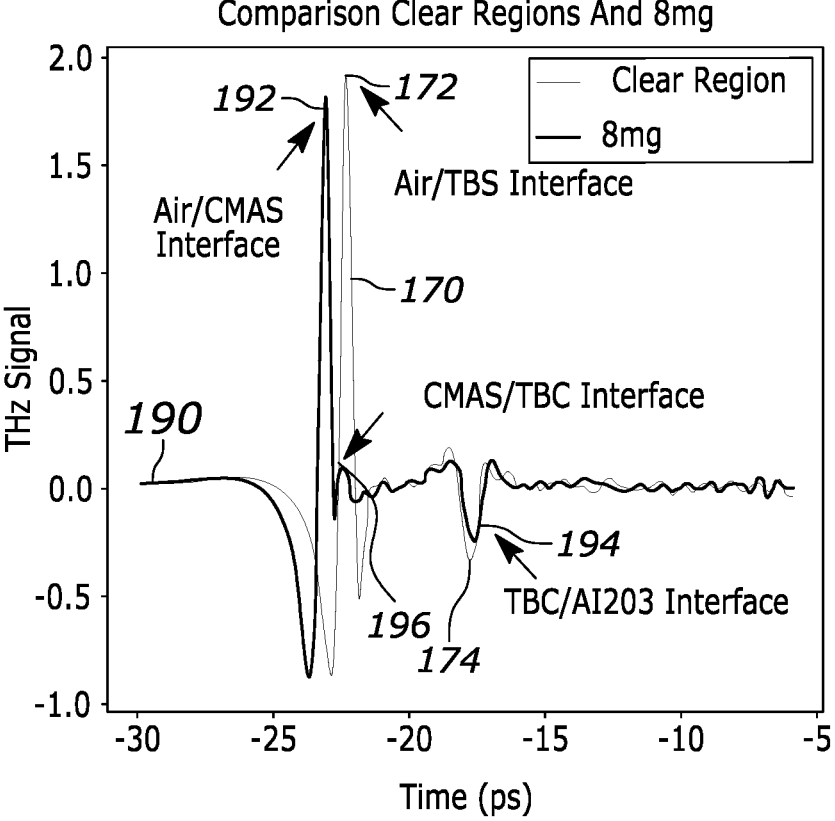

FIGS. 4A, 4B, and 4C include exemplary reflected electromagnetic waveforms. FIGS. 4A, 4B, and 4C show a time domain representation of the reflected electromagnetic radiation waveforms.

FIG. 4A includes a graph showing a first electromagnetic radiation waveform 170. The first electromagnetic radiation waveform 170 was reflected from a pristine sample. The graph depicts an electric field of the electromagnetic radiation signal as a function of time in picoseconds (ps). The pristine sample is a sample from a component having a thermal barrier coating (TBC) that was not exposed to outside conditions, such as foreign materials, or engine operating conditions. The pristine sample has no CMAS infiltration or deposits. The component is made of aluminum oxide ($Al_2O_3$). The first electromagnetic radiation waveform 170 includes a first peak 172 and a second peak 174. The first peak 172 results from an interface between air and the thermal barrier coating. The second peak 174 results an interface between the thermal barrier coating and the component.

FIG. 4B includes a graph showing the first electromagnetic radiation waveform 170 and a second electromagnetic radiation waveform 180 interposed on the same graph. The graph depicts an electric field of the electromagnetic radiation signal as a function of time in picoseconds (ps). The second electromagnetic radiation waveform 180 was reflected from a second sample. The second sample is a sample from the component with 4 milligrams (mg) of CMAS introduced over an area of 1 cubic centimeter ($cm^2$) of the thermal barrier coating. In the second sample, the CMAS is infiltrated into the thermal barrier coating and no CMAS is deposited on top of the thermal barrier coating. The second electromagnetic radiation waveform 180 includes a first peak 182 and a second peak 184. The first peak 182 results from an interface between air and the thermal barrier coating. The first peak 182 shows the maximum energy ($E_{max}$) from the time domain representation of the waveform. The second peak 184 results from an interface between the thermal barrier coating and the component. The second peak 184 shows the minimum energy ($E_{min}$) from the time domain representation of the waveform.

The second electromagnetic radiation waveform 180 is similar to the first electromagnetic radiation waveform 170 but the second peak 184 of the second electromagnetic radiation waveform 180 is shifted in time from the second peak 174 of the second electromagnetic radiation waveform 180. The time shift between the second peak 184 and the second peak 174 is due, at least in part, to the infiltration of CMAS into the thermal barrier coating. There is also a greater transit time between the first peak 182 (e.g., the air-thermal barrier coating interface) and the second peak 184 (e.g., the thermal barrier coating-component interface) in the infiltrated sample than there is between the first peak 172 (e.g., the air-thermal barrier coating interface) and the second peak 174 (e.g., the thermal barrier coating-component interface) in the pristine sample. In addition, an electric field ($E_{min}$) of the second peak 184 from the infiltrated sample is less than an electric field ($E_{min}$) of the second peak 174 from the pristine sample. Similarly, the electric field ($E_{max}$) of the first peak 182 of the second electromagnetic radiation waveform 180 is less than the electric field ($E_{max}$) of the first peak 172 of the first electromagnetic radiation waveform 170. Amplitudes can also be determined via a power spectrum obtained from a fast Fourier transform (FFT) to convert the time domain representations to frequency domain representations of the first electromagnetic radiation waveform 170 and the second electromagnetic radiation waveform 180.

The changes in electric field of the time domain representation (or amplitude of the frequency domain representation) reflect a loss of energy in the electromagnetic radiation as it passes through the thermal barrier coating. The loss of energy is due, at least in part, to the CMAS infiltration in the thermal barrier coating which, as discussed above, results in an increase in the density or refractive index of the coating. The ratio of the electric field ($E_{max}$) of the first peak 182 to the electric field ($E_{max}$) of the first peak 172 reflects a level of foreign material infiltration. Likewise, the ratio of the electric field ($E_{min}$) of the second peak 184 to the electric field ($E_{min}$) of the second peak 174 indicates a level of foreign material infiltration into the thermal barrier coating. The time shift between peaks and changes in electric fields in the time domain representation of the waveform between the infiltrated sample and the pristine sample is due, at least in part, to an increase in the refractive index and more absorption or scattering due to CMAS infiltration.

FIG. 4C includes a graph showing the first electromagnetic radiation waveform 170 and a third waveform 190 interposed on the same graph. The graph depicts an electric field (time domain representation) of the electromagnetic radiation signal as a function of time in picoseconds (ps). The third waveform was reflected from a third sample. The third sample is a sample from the component with 8 milligrams (mg) of CMAS introduced over an area of 1 cubic centimeter ($cm^2$) of the thermal barrier coating. In the third sample, the CMAS is infiltrated into the thermal barrier coating and a layer of CMAS is also deposited on top of the thermal barrier coating. The third waveform 190 includes a first peak 192, a second peak 194, and a third peak 196. The first peak 192 results from an interface between air and the CMAS layer. The second peak 194 results from an interface between the thermal barrier coating and the component. The third peak 196 results from an interface between the CMAS and the thermal barrier coating.

The third waveform 190 is similar to the first electromagnetic radiation waveform 170 but the second peak 194 of the third waveform 190 is shifted in time from the second peak 174 of the first electromagnetic radiation waveform 170. The time shift between the second peak 194 and the second peak 174 is due, at least in part, to the infiltration of CMAS in the thermal barrier coating, which results in an increase in density and refractive index of the thermal barrier coating. In addition, the third waveform 190 includes the third peak 196 due to the deposited layer of CMAS present on the thermal barrier coating. The deposited layer of CMAS on the thermal barrier coating also results in the electromagnetic radiation reaching the detector of the electromagnetic inspection device faster than for a thermal barrier coating without deposited CMAS.

Figure 5:
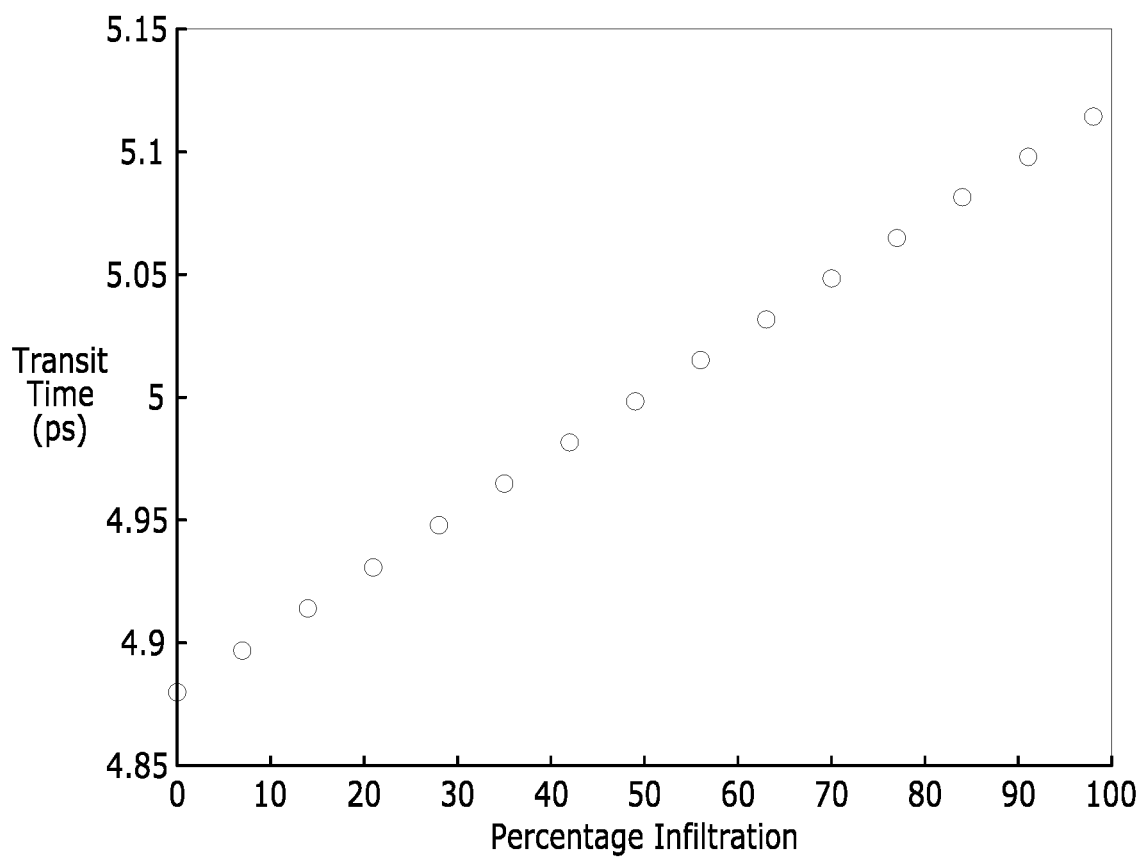
FIG. 5 is a graph of transit time as a function of percent infiltration of CMAS in a coating.

FIG. 5 is a graph showing transit time of electromagnetic radiation through a coating in picoseconds (ps) as a function of percentage of CMAS infiltration into a coating. The coating may be, for example, a protective coating such as a thermal barrier coating. It is contemplated that transit time through the coating may increase as CMAS infiltration increases due to a change in the refractive index of the thermal barrier coating that results from infiltration. As shown, the transit time correlates with percent CMAS infiltration such that the level of CMAS infiltration in a sample can be estimated or predicted based on the transit time of electromagnetic radiation reflected from the sample. The remaining life of the thermal barrier coating may also be correlated with the percent CMAS infiltration. Effective medium theory or approximations can be used to calculate the properties of the coating, such as refractive index of the coating, with CMAS infiltrated into the coating. In some approaches, an effective medium theory is used to determine an effective property, such as a refractive index, of a composite material (e.g., a first or bulk material with infiltration by a second material) based on the properties of the bulk material and the second or infiltrated material. Any suitable effective medium theory may be used.

The graph of FIG. 5 illustrates that, for a given coating thickness, the transit time increases with the percentage of infiltration of foreign material into the coating. The coating thickness analyzed to generate the graph of FIG. 5 was about 160 micrometers (μm). Two known samples were analyzed to generate the graph. A first sample included a thermal barrier coating completely infiltrated with CMAS (100% infiltration). A second sample was a pristine sample with no CMAS infiltration (0% infiltration). The percent infiltration for intermediate points was calculated to determine the resolution of the approaches described herein, that is, a minimum level of CMAS infiltration detectable using such approaches. It was determined that about 7% infiltration can be detected for the coating thickness of about 160 micrometers (μm). In the graph of FIG. 5, the 7% infiltration represents the distance or steps between points on the x-axis.

Figure 6:
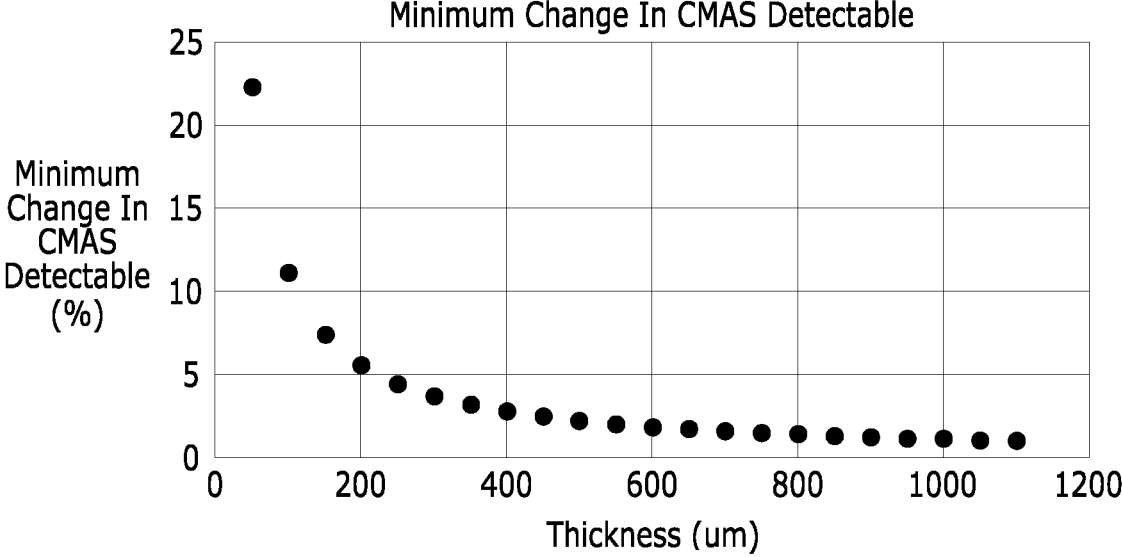
FIG. 6 is a graph of a percent change in detectable CMAS as a function of CMAS thickness.

FIG. 6 is a graph showing a minimum CMAS infiltration that is detectable using the approaches described herein. The graph shows a minimum percent CMAS infiltration that is detectable using the approaches described herein as a function of the thickness of the coating. In FIG. 6, the minimum change in CMAS infiltration that is detectable was determined for coating thicknesses ranging from about 50 micrometers (μm) to about 1100 micrometers (μm). As illustrated in FIG. 6, the minimum percent CMAS infiltration into a coating that is detectable using the approaches described herein may vary as a function of the thickness of the coating. Smaller changes in CMAS infiltration may be detectable in thicker coatings.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B. Similarly, the word "or" when used herein shall be interpreted as having a disjunctive construction rather than a conjunctive construction unless otherwise specifically indicated.

Further aspects of the disclosure are provided by the subject matter of the following clauses:

A system comprising: an electromagnetic inspection device including: an electromagnetic radiation source to generate pulsed electromagnetic radiation that penetrates through a coating of a component of an engine; and a detector to receive reflected electromagnetic radiation that is reflected from the component; and a controller in operative communication with the electromagnetic inspection device, the controller being configured to: receive an electromagnetic radiation waveform that is representative of the reflected electromagnetic radiation; determine a property of the coating based on the electromagnetic radiation waveform; determine a remaining life of the coating based on the property; and update a model of the engine based on the remaining life of the coating.

The system of any preceding clause, wherein the electromagnetic radiation source is to generate pulsed electromagnetic radiation in a terahertz frequency range.

The system of any preceding clause, wherein the coating is a thermal barrier coating.

The system of any preceding clause, wherein the controller is further configured to assess a condition of the coating based on the property of the coating, wherein the remaining life of the coating is based on the condition of the coating.

The system of any preceding clause, wherein the controller is further configured to determine the remaining life based on calibration data that includes a relationship between the condition of the coating and the remaining life of the coating.

The system of any preceding clause, wherein the condition of the coating is a level of foreign material infiltration into the coating.

The system of any preceding clause, wherein the electromagnetic radiation waveform includes a first electromagnetic radiation waveform and a second electromagnetic radiation waveform, and wherein the controller is to determine the property of the coating is based on at least one of: a time shift between a first peak of the first electromagnetic radiation waveform and a first peak of the second electromagnetic radiation waveform; a change in amplitude or electric field between the first peak of the first electromagnetic radiation waveform and the first peak of the second electromagnetic radiation waveform; an additional peak present in the second electromagnetic radiation waveform; or a transit time between the first peak of the first electromagnetic radiation waveform and a second peak of the first electromagnetic radiation waveform.

The system of any preceding clause, wherein the first electromagnetic radiation waveform is from a first scan of the component at a first time and the second electromagnetic radiation waveform is from a second scan of the component at a second time.

The system of any preceding clause, wherein the property is a dielectric property of the coating or a loss of material from the coating.

The system of any preceding clause, wherein the controller is configured to determine the remaining life of the coating based on calibration data that includes a relationship between the property of the coating and the remaining life of the coating.

The system of any preceding clause, wherein the controller is configured to compare the remaining life of the coating to a threshold value, wherein the controller determines an action for the engine upon determining that the remaining life of the coating falls below the threshold value.

A method comprising: at an electromagnetic radiation source, directing pulsed electromagnetic radiation through a coating of a component of an engine; at a detector, receiving reflected electromagnetic radiation that is reflected from at least one of the coating or the component; determining a property of the coating based on the reflected electromagnetic radiation; determining a remaining life of the coating based on the property; and adjusting operation or maintenance of the engine based on the remaining life.

The method of any preceding clause, wherein the electromagnetic radiation source generates pulsed electromagnetic radiation in a terahertz frequency range.

The method of any preceding clause, wherein the coating is a thermal barrier coating.

The method of any preceding clause, wherein the property is a dielectric property of the coating or a loss of material from the coating.

The method of any preceding clause, further comprising: determining a condition of the coating based on the property.

The method of any preceding clause, wherein the condition is a level of foreign material infiltration into the coating.

The method of any preceding clause, further comprising: receiving a reflected electromagnetic waveform that is representative of the reflected electromagnetic radiation, the reflected electromagnetic waveform including a first electromagnetic radiation waveform and a second electromagnetic radiation waveform, wherein determining the property of the coating is based on at least one of a time shift between a first peak of the first electromagnetic radiation waveform and a first peak of the second electromagnetic radiation waveform; a change in amplitude or electric field between the first peak of the first electromagnetic radiation waveform and the first peak of the second electromagnetic radiation waveform; an additional peak present in the second electromagnetic radiation waveform; or a transit time between the first peak of the first electromagnetic radiation waveform and a second peak of the first electromagnetic radiation waveform; and comparing the first electromagnetic radiation waveform to the second electromagnetic radiation waveform, wherein the first electromagnetic radiation waveform is from a first scan of the component at a first time and the second electromagnetic radiation waveform is from a second scan of the component at a second time.

A non-transitory computer readable storage medium comprising instructions that, when executed, cause a processor of a controller to: receive electromagnetic radiation waveform reflected from at least one of a coating of a component of an engine or the component; determine a property of the coating based on the electromagnetic radiation waveform; determine a remaining life of the coating based on the property; and update a model of the engine based on the remaining life.

The non-transitory computer readable storage medium of any preceding clause, wherein the controller is further configured to: determine a condition of the coating based on the property, wherein the remaining life of the coating is based on the condition of the coating; and determine the remaining life based on calibration data that includes a relationship between the condition of the coating and the remaining life of the coating.

What is claimed is:

1. A system comprising:
an electromagnetic inspection device including:
an electromagnetic radiation source to generate pulsed electromagnetic radiation that penetrates through a coating of a component of an engine;

a detector to receive reflected electromagnetic radiation that is reflected from the component; and
a controller in operative communication with the electromagnetic inspection device, the controller being configured to:
cause the electromagnetic radiation source to direct at least some pulsed electromagnetic radiation through the coating;
receive an electromagnetic radiation waveform that is representative of reflected electromagnetic radiation that is reflected from the coating;
determine a change in a dielectric property of the coating based on the electromagnetic radiation waveform;
receive calibration data that includes a relationship between the change in the dielectric property and a level of foreign material infiltration into the coating;
determine the level of foreign material infiltration into the coating based at least in part upon the relationship;
determine a remaining life of the coating based at least in part upon a relationship between foreign material infiltration of the coating and remaining life of the coating; and
update a model of the engine based on the remaining life of the coating.

2. The system of claim 1, wherein the electromagnetic radiation source is to generate pulsed electromagnetic radiation in a terahertz frequency range.

3. The system of claim 1, wherein the level of foreign material infiltration is representative of a depth of foreign material infiltration into the coating.

4. The system of claim 1, wherein the controller is further configured to compare the electromagnetic radiation waveform to baseline data indicative of electromagnetic radiation reflected from the coating in a prior state.

5. The system of claim 4, wherein the controller is further configured to determine a change between the electromagnetic radiation waveform relative to the baseline data.

6. The system of claim 4, wherein the controller is configured to determine the remaining life of the coating based at least in part upon the comparison.

7. The system of claim 1, wherein the electromagnetic radiation waveform includes a first electromagnetic radiation waveform and a second electromagnetic radiation waveform, and wherein the controller is to determine the dielectric property of the coating based on at least one of: a time shift between a first peak of the first electromagnetic radiation waveform and a first peak of the second electromagnetic radiation waveform; a change in amplitude or electric field between the first peak of the first electromagnetic radiation waveform and the first peak of the second electromagnetic radiation waveform; an additional peak present in the second electromagnetic radiation waveform; or a transit time between the first peak of the first electromagnetic radiation waveform and a second peak of the first electromagnetic radiation waveform.

8. The system of claim 7, wherein the first electromagnetic radiation waveform is from a first scan of the component at a first time and the second electromagnetic radiation waveform is from a second scan of the component at a second time.

9. The system of claim 1, wherein the dielectric property is a refractive index.

10. The system of claim 1, wherein the controller is further configured to determine an action for the engine or the coating based on the remaining life.

11. The system of claim 1, wherein the controller is configured to compare the remaining life of the coating to a threshold value, wherein the controller determines an action for the engine upon determining that the remaining life of the coating falls below the threshold value.

12. A method comprising:

at an electromagnetic radiation source, directing at least some pulsed electromagnetic radiation through a coating of a component of an engine;

at a detector, receiving reflected electromagnetic radiation that is reflected from at least one of the coating or the component;

determining a change in a dielectric property of the coating based on the reflected electromagnetic radiation;

receiving calibration data that includes a relationship between the change in the dielectric property and a level of foreign material infiltration into the coating;

determining the level of foreign material infiltration into the coating based at least in part upon the relationship;

determining a remaining life of the coating based at least in part upon a relationship between foreign material infiltration of the coating and remaining life of the coating; and adjusting operation or maintenance of the engine based on the remaining life.

13. The method of claim 12, wherein the electromagnetic radiation source generates pulsed electromagnetic radiation in a terahertz frequency range.

14. The method of claim 12, wherein the level of foreign material infiltration is representative of a depth of foreign material infiltration into the coating.

15. The method of claim 12, further comprising:

comparing data indicative of the reflected electromagnetic radiation to baseline data indicative of electromagnetic radiation reflected from the coating in a prior state, wherein the remaining life is based at least in part upon the comparison.

16. The method of claim 12, further comprising:

determining an action for the engine or the component based on the remaining life.

17. The method of claim 16, wherein the dielectric property is a refractive index.

18. The method of claim 17, further comprising:

receiving a reflected electromagnetic waveform that is representative of the reflected electromagnetic radiation, the reflected electromagnetic waveform including a first electromagnetic radiation waveform and a second electromagnetic radiation waveform, wherein determining the dielectric property of the coating is based on at least one of a time shift between a first peak of the first electromagnetic radiation waveform and a first peak of the second electromagnetic radiation waveform; a change in amplitude or electric field between the first peak of the first electromagnetic radiation waveform and the first peak of the second electromagnetic radiation waveform; an additional peak present in the second electromagnetic radiation waveform; or a transit time between the first peak of the first electromagnetic radiation waveform and a second peak of the first electromagnetic radiation waveform; and comparing the first electromagnetic radiation waveform to the second electromagnetic radiation waveform, wherein the first electromagnetic radiation waveform is from a first scan of the component at a first time and the second electromagnetic radiation waveform is from a second scan of the component at a second time.

19. A non-transitory computer readable storage medium comprising instructions that, when executed, cause a processor of a controller to:

cause an electromagnetic radiation source to direct at least some pulsed electromagnetic radiation through a coating of a component of an engine;

receive electromagnetic radiation waveform reflected from at least one of the coating or the component;

determine a change in a dielectric property of the coating based on the electromagnetic radiation waveform;

receive calibration data that includes a relationship between the change in the dielectric property and a level of foreign material infiltration into the coating;

determine the level of foreign material infiltration into the coating based at least in part upon the relationship;

determine a remaining life of the coating based at least in part upon a relationship between foreign material infiltration of the coating and remaining life of the coating; and update a model of the engine based on the remaining life.

20. The non-transitory computer readable storage medium of claim 19, wherein the level of foreign material infiltration is representative of a depth of foreign material infiltration into the coating, and wherein the controller is further configured to:

determine an action for at least one of the engine or the component based on the remaining life.

\* \* \* \* \*